United States Patent
Ramesh et al.

(10) Patent No.: US 7,342,071 B2
(45) Date of Patent: Mar. 11, 2008

(54) CLEARCOAT PAINT COMPOSITION

(75) Inventors: Swaminathan Ramesh, Canton, MI (US); Donald H. Campbell, Hartland, MI (US); Marvin L Green, Brighton, MI (US); Heinz-Peter Rink, Münster (DE)

(73) Assignee: BASF Corporation, Southfield, MI (US)

( * ) Notice: Subject to any disclaimer, the term of this patent is extended or adjusted under 35 U.S.C. 154(b) by 183 days.

(21) Appl. No.: 11/227,868

(22) Filed: Sep. 15, 2005

(65) Prior Publication Data

US 2006/0128901 A1 Jun. 15, 2006

Related U.S. Application Data

(63) Continuation-in-part of application No. 10/957,568, filed on Oct. 1, 2004, now Pat. No. 7,232,863, which is a continuation-in-part of application No. 10/285,214, filed on Oct. 31, 2002, now abandoned.

(51) Int. Cl.
*C08L 29/02* (2006.01)
(52) U.S. Cl. .................. 525/162; 525/163; 526/301; 526/304
(58) Field of Classification Search .............. 525/162, 525/163; 526/301, 304
See application file for complete search history.

(56) References Cited

U.S. PATENT DOCUMENTS

| 4,279,833 A | 7/1981 | Culbertson et al. |
| 5,726,244 A | 3/1998 | McGee et al. ............... 525/78 |
| 6,160,058 A | 12/2000 | Ohrbom et al. ............ 525/481 |

FOREIGN PATENT DOCUMENTS

| EP | 0761695 A2 | 3/1997 |
| WO | 94/10211 A1 | 5/1994 |
| WO | 97/01608 A1 | 1/1997 |
| WO | 00/37560 A1 | 6/2000 |
| WO | 01/46319 A1 | 6/2001 |
| WO | 2004/048423 A2 | 6/2004 |

OTHER PUBLICATIONS

Search Report for PCT/US2006/033042, Filing Date Aug. 24, 2006.
Written Opinion of the International Searching Authority for PCT/US2006/033042, Filing Date Aug. 24, 2006.

*Primary Examiner*—Bernard Lipman

(57) ABSTRACT

A coating composition including a copolymerization product of a mixture of monomers including one or more carbamate-functional monomers and (meth)acrylic monomers, some having carboxylic acid-functionality. The monomer mixture is essentially free of hydroxyl monomers. The coating composition may be a solvent-borne clearcoat coating composition, preferably an automotive clearcoat coating composition, that may be applied over a water-borne basecoat coating composition.

7 Claims, No Drawings

CLEARCOAT PAINT COMPOSITION

RELATED APPLICATIONS

This application is a continuation in part of U.S. Ser. No. 10/957,568, filed Oct. 1, 2004, now U.S. Pat. No. 7,232,863, which is a continuation in part of U.S. Ser. No. 10/285,214 filed Oct. 31, 2002, now abandoned.

FIELD OF THE INVENTION

The present invention relates to thermoset clearcoat compositions, and more particularly, to automotive topcoat coatings.

BACKGROUND OF THE INVENTION

Curable, or thermosettable, coating compositions are widely used in the coatings art, particularly for topcoats in the automotive and industrial coatings industry. Basecoat-clearcoat composite coatings are particularly useful as topcoats for which exceptional gloss, depth of color, distinctness of image, or special metallic effects are desired. The automotive industry has made extensive use of these coatings for automotive body panels. Automotive clearcoats must meet many performance requirements. They must be smooth and glossy to provide the desired aesthetic appeal. They must also be durable, both to preserve the coating appearance and to protect the steel substrate, by resisting scratching and marring and also degradation from UV light in sunlight, environmental etching, and heat.

Carbamate-functional materials have found particular utility in coating compositions as cross-linkable resins. Clearcoat compositions containing carbamate-functional acrylic polymers can provide significant advantages over other coating compositions, such as hydroxy-functional acrylic/melamine coating compositions as a solution to the problem of environmental etch. Environmental etch, or acid etch, results in spots or marks on or in the coating that often cannot be rubbed out.

While such polymers and compositions containing carbamate-functional materials provide a significant improvement over the prior art, improvements in some areas are still desirable. In particular, it would be advantageous to provide polymers exhibiting the ability to go over solvent-borne as well as water-borne basecoat paints, while still possessing the positive environmental etch and performance characteristics of carbamate-functional acrylics.

Thus, there remains a need for coating compositions that have both solvent-borne and water-borne capabilities and can be applied using existing equipment in plants that are configured to handle more traditional coatings technology. Such a coating composition still must provide a cured coating having the desired physical properties.

SUMMARY OF THE INVENTION

The coating composition of the invention is a clearcoat coating composition, preferably an automotive clearcoat coating composition, containing a copolymerization product of a monomer mixture essentially free of hydroxyl monomers. In preferred embodiments, the monomer mixture includes one or more carbamate-functional monomers and one or more carboxylic acid-functional monomers. In certain embodiments, the copolymerization product includes one or more monomer units of a condensation product of a polymerizable ester or ether, and neodecanoic acid.

In another embodiment, the present invention provides a method of making a clearcoat composition. The method includes copolymerizing a monomer mixture comprising one or more carbamate-functional monomers with one or more carboxylic acid-functional monomers, wherein the mixture is essentially free of hydroxyl monomer. The clearcoat coating composition is applied to a substrate having a basecoat. The composition is then cured to form a composite layer.

In still another embodiment, the present invention provides a process for coating a water-borne basecoat with a solvent-borne clearcoat. The method includes applying a water-borne basecoat coating composition over a substrate. A solvent-borne clearcoat coating composition is applied over the basecoat composition. The applied basecoat and clearcoat coating composition are then cured to form a composite coating layer. In preferred embodiments, the clearcoat composition includes a copolymerization product of (meth)acrylate monomers having carbamate-functionality copolymerized with a monomer mixture comprising one or more carbamate-functional monomers and one or more carboxylic acid-functional monomers. The monomer mixture is essentially free of hydroxyl monomer.

The invention further provides an article, such as an automotive vehicle, having a surface coated with a coating derived from the coating composition of the invention, particularly a composite coating having a basecoat layer and a clearcoat layer, and a method of producing such a coating on a substrate, particularly as a basecoat/clearcoat composite coating, with the coating composition of the invention preferably forming at least the clearcoat of the composite coating.

DETAILED DESCRIPTION OF THE INVENTION

The following description of the preferred embodiment(s) is merely exemplary in nature and is in no way intended to limit the invention, its application, or uses.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

The clearcoat composition of the present invention includes a copolymer of (meth)acrylate monomers with carbamate-functionality that is co-polymerized with a mixture of other acrylic or methacrylic monomers, preferably having carboxylic acid-functionality. The monomer mixture is essentially free of hydroxyl functionality. The term "(meth)acrylate" as used herein refers to both acrylate and methacrylate. Polymers include both oligomers of relatively low molecular weight and polymers of relatively high molecular weight. The term "copolymers" is contemplated to include oligomers and polymers polymerized from more than one kind of monomer.

It will be appreciated that the term "functional", as used in this description, refers to the potential for crosslinking to occur after formation of a polymeric emulsion with an external crosslinking agent.

A carbamate group according to the invention may be represented by the structure

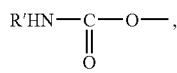

in which R' is H or alkyl. Preferably, R' is H or alkyl of from 1 to about 4 carbon atoms, and more preferably R' is H (a primary carbamate).

In a preferred embodiment, the copolymer of the present coating composition has at least one monomer unit including the condensation product of an ethylenically unsaturated carboxylic acid group and glycidyl ester of a mixture of tertiary acids having 9 to 11 carbon atoms having at least one methyl group on the α-carbon. In an alternate preferred embodiment, at least one monomer unit includes the polymerization product of the condensation product of a polymerizable glycidyl ester or ether and a mixture of tertiary acids having 9 to 11 carbon atoms having at least one methyl group on the α-carbon. Mixtures of tertiary acids having 9 to 11 carbon atoms having at least one methyl group on the α-carbon are available under the trademark VERSATIC™ acid, and the glycidyl ester of VERSATIC™ acid (also commonly called neodecanoic acid) is available under the brand name CARDURA® Resin E-10 from Shell Oil Company. Examples of polymerizable acids include, without limitation, acrylic acid, methacrylic acid, crotonic acid, fumaric acid, maleic acid, and itaconic acid, and anhydrides and monoalkyl esters of the difunctional acids. Examples of polymerizable glycidyl esters and ethers include, without limitation, glycidyl acrylate, glycidyl methacrylate, and allyl glycidyl ether.

With particular reference to one preferred acrylic polymer, then, the carbamate-functionality may be conveniently introduced by polymerizing a monomer having a carbamate group. It is also possible to polymerize with a monomer having functionality that may be reacted to supply a carbamate group after polymerization. Examples of addition polymerizable monomers having carbamate-functionality include, without limitation, carbamate propyl acrylate (CPA), carbamate propyl methacrylate (CPMA), and carbamate ethyl methacrylate (CEMA). Carbamate-functionality can be introduced to an acrylic polymer by a number of reactions, including, without limitation, converting hydroxyl groups to carbamates by other methods, such as those set out in Ohrbom et al, U.S. Pat. No. 6,160,058 and McGee et al., U.S. Pat. No. 5,726,244, both of which are incorporated herein by reference. The hydroxyl groups may arise from reacting glycidyl functionality with a carboxylic acid or reacting a carboxylic acid group with a glycidyl compound;

In one preferred embodiment, the acrylic polymer has an equivalent weight (with respect to the carbamate-functionality) of up to about 650 grams/equivalent, more preferably up to about 520 grams/equivalent, still more preferably up to about 435 grams/equivalent, more preferably up to about 370 grams/equivalent, and most preferably up to about 350 grams/equivalent. The acrylic polymer preferably has an equivalent weight (with respect to the carbamate-functionality) of at least about 260 grams/equivalent, more preferably at least about 290 grams/equivalent, and still more preferably at least about 310 grams/equivalent. The acrylic polymer preferably has equivalent weight in the range of 260 to 650 grams/equivalent, more preferably 290 to 520 grams/equivalent, still more preferably 290 to 435 grams/equivalent, even more preferably 290 to 370 grams/equivalent, and most preferably 310 to 350 grams/equivalent.

In various embodiments, the present invention provides polymerization of a monomer mixture that includes at least one carboxylic acid-functional monomer or at least one monomer that has a group that is converted to an acid group following polymerization, such as an anhydride group. Examples of acid-functional or anhydride-functional monomers include, without limitation, α, β-ethylenically unsaturated monocarboxylic acids containing 3 to 5 carbon atoms such as acrylic, methacrylic, crotonic acids, and optionally, the esters of those acids; α, β-ethylenically unsaturated dicarboxylic acids containing 4 to 6 carbon atoms and the anhydrides, monoesters such as maleic anhydride, maleic acid monomethyl ester, and fumaric acid, and optionally, the diesters of those acids; monomers containing a carboxyl group: sorbic, cinnamic, vinyl furoic, α-chlorosorbic, p-vinylbenzoic, maleic, fumaric, aconitic, atropic, and itaconic acids; and acid-functional derivatives of copolymerizable monomers, such as the hydroxyethyl acrylate half-ester of an anhydride, such as succinic acid. Other preferred half esters include lower alkyl esters containing 1 to 6 carbon atoms such as itaconic acid monomethyl ester, butyl acid itaconate, methyl acid fumarate, butyl acid fumarate, methyl acid maleate and butyl acid maleate.

In various embodiments, an acid-functional monomer is preferably included in an amount from about 5% to about 25% by weight of the monomers being polymerized, and preferably from about 12% to about 25% by weight of the monomers being polymerized.

Acid-functionality may also be provided by other known means, such as by reaction of an hydroxyl group with a cyclic anhydride or by hydrolysis of an ester, such as by hydrolysis of a tert-butyl methacrylate monomer unit. Alternately, it may be preferred to include an acid-functional monomer such as acrylic acid, methacrylic acid, or crotonic acid, or an anhydride monomer such as maleic anhydride or itaconic anhydride that may be hydrated after polymerization to generate acid groups.

The acrylic polymer may be polymerized using further co-monomers. Further representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The co-monomers may be used in any combination.

The acrylic polymer or polymers may be prepared using conventional techniques, such as by heating the monomers in the presence of a polymerization initiating agent and optionally chain transfer agents. The polymerization is preferably carried out in solution, although it is also possible to polymerize the acrylic polymer in bulk.

The solvent or solvent mixture is generally heated to the reaction temperature and the monomers and initiator(s) and optionally chain transfer agent(s) are added at a controlled rate over a period of time, typically from about two to about six hours. The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture is usually held at the reaction temperature after the additions are completed for a period of time to complete the polymerization. Optionally, additional initiator may be added to ensure complete conversion of monomers to polymer.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The acrylic polymer or polymers should have a weight average molecular weight of at least about 2,400, preferably at least about 3,000, more preferably at least about 3,500, and particularly preferably at least about 4,000. Weight average molecular weight may be determined by gel permeation chromatography using polystyrene standard. In addition, the weight average molecular weight is preferably up to about 5,000, more preferably up to about 4,750, and still more preferably up to about 4,500.

Although aqueous coating compositions that are free of regulated volatile organic compounds (VOCs) are preferred, a solvent may optionally be utilized in the coating composition used in the practice of the present invention. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, or a combination of any of these. Examples of useful solvents include, without limitation, methyl ethyl ketone, methyl isobutyl ketone, m-amyl acetate, ethylene glycol butyl ether acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

In general, the co-solvents are water-miscible organic solvents that can be up to about 50% by weight, based on the total amount of volatile materials (i.e., water plus organic solvents). In a preferred embodiment, the water is at least about 10%, more preferably at least about 15%, still more preferably at least about 20%, and even more preferably at least about 25% by weight of the total amount of volatile material.

The organic phase of the coating composition includes the polymer having a sufficient amount of the carboxylic acid and carbamate-functionalities and a sufficient amount of the water-miscible organic solvent to form a colloidal emulsion of the water. The organic phase further includes a low hydrogen bonding oxygenated solvent, which advantageously reduces the viscosity of the coating composition.

In a preferred embodiment, the coating composition has a viscosity is 200 centipoise or less. Coating compositions at this viscosity can be applied using the same application equipment as is used with traditional high solids coating technology. Accordingly, the monomers used to prepare the acrylic or other polymer are selected and apportioned to achieve the desired viscosity, and in conjunction therewith the molecular weight of the polymer and the water miscible solvent or solvent blend are likewise selected to achieve the desired viscosity.

The volatile organic content (VOC) of the coating composition, as measured according to EPA Method 24, is preferably about 3.5 lbs./gal. or less, more preferably about 3.2 lbs./gal. or less, and even more preferably about 3.0 lbs./gal. or less (without water). (VOC values used herein are those calculated without water.) The VOC is minimized as much as possible by using the minimum amount of organic solvent along with the maximum amount of water to obtain the desired viscosity.

The coating composition preferably contains one or more crosslinking agents that react with the acrylic polymer after the coating composition is applied to form a cured coating. The composition preferably includes at least one crosslinking agent that is reactive with carbamate-functionality. The crosslinking agents have two or more groups reactive with the polymer, and the crosslinker advantageously has affinity for water. That is, the crosslinking agents preferably have a polar group or groups. A certain amount of crosslinking agents without affinity for water may also be included.

The crosslinker may be monomeric, oligomeric, or polymeric. Examples of suitable crosslinking agents include, without limitation, aminoplast crosslinkers. The aminoplast crosslinker is advantageously a monomeric, preferably partially alkylated, particularly preferably partially methylated, melamine formaldehyde resin. Melamine formaldehyde resins having imino content are also useful.

The clearcoat composition includes preferably at least about 10% by weight, more preferably at least about 15% by weight, of the crosslinker, based on the nonvolatile vehicle. "Non-volatile vehicle" refers to the film forming components. In preferred embodiments, the crosslinker is at least about 5%, more preferably at least about 10% by weight of the nonvolatile vehicle. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The clearcoat coating composition may include one or more catalysts to enhance the cure reaction, and preferably include at least one catalyst for the aminoplast curing agent reaction and one catalyst for the polyisocyanate curing agent reaction. Suitable catalysts for the aminoplast curing agent reactions include, without limitation, alkylsulfonic acids, arylsulfonic acid, and alkylarylsulfonic acids, such as methane sulfonic acid, P-toluene sulfonic acid, dinonylnaphthalene disulfonic acid, dodecylbenzenesulfonic acid; phosphoric acid and its esters such as phenyl acid phosphate, butyl phosphate, and hydroxy phosphate esters; monobutyl maleate, boron trifluoride etherate, trimellitic acid, and triflic acid. Strong acid catalysts are often blocked, e.g. with an amine.

Additional agents, for example surfactants, stabilizers, wetting agents, rheology control agents, fillers, pigments, colorants, fungicides, dispersing agents, adhesion promoters, UV absorbers, hindered amine light stabilizers, and the like as known to those skilled in the art of coating formulations may be included and are contemplated as within the scope of the invention. While such additives are well-known in the prior art, the amount used must be controlled to avoid adversely affecting the coating characteristics.

In a preferred embodiment, the coating composition of the invention is a coating composition for an automotive vehicle. Among the kinds of automotive coating compositions are primers and primer surfacers, topcoats, basecoats, and clearcoats. Clearcoats are particularly preferred.

The coating compositions can be coated on the article by any of a number of techniques well-known in the art. These include, for example, spray coating, dip coating, roll coating, curtain coating, and the like. For automotive body panels, spray coating is preferred.

In various embodiments, the coating composition is used as the clearcoat of a composite color-plus-clear coating. The pigmented basecoat composition over which it is applied may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include epoxy, acid, anhydride, silane, and acetoacetate groups. Preferred crosslinkable functional groups include hydroxy functional groups, acid-functional groups, and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. In one preferred embodiment, the present invention provides a process for coating a water-borne basecoat with a solvent-borne clearcoat. In various embodiments, a substrate is first coated with a primer, such as an electroconductive primer coating known in the art. A water-borne basecoat coating composition is applied over the primed substrate and may be flashed for a short period of time. The solvent-borne clearcoat coating composition is then applied over the basecoat coating. The clearcoat coating is allowed to flash for a short period of time prior to being baked and curing to form a composite coating layer.

The coating compositions described herein are preferably subjected to conditions so as to cure the coating layers. Although various methods of curing may be used, heat curing is preferred. Generally, heat curing is effected by exposing the coated article to elevated temperatures provided primarily by radiative heat sources. Curing temperatures will vary depending on the particular blocking groups used in the crosslinking agents; however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15-25 minutes for blocked acid catalyzed systems and 10-20 minutes for unblocked acid catalyzed systems. The curing times may also be expressed as time after metal temperature reaches the bake temperature ("metal temperature"). For example, the curing time may be for 5 to 30 minutes, preferably 10 to 20 minutes.

Once cured, a solvent-borne clearcoat over water-borne basecoat composite of the present invention yields a film having high etch performance and repair adhesion. Unlike similar formulations in the prior art, the present invention provides a combined water-borne basecoat—solvent-borne clearcoat composition that has minimal haze and is essentially free of wrinkles.

The clearcoat coating composition may include further carbamate-functional compounds. Such carbamate-functional compounds include, without limitation, any of those described in U.S. Pat. Nos. 6,160,058, 6,084,038, 6,080,825, 5,994,479, the disclosures of which are incorporated by reference. In particular, the composition may include a carbamate-functional or urea-functional material comprising at least two functional groups, at least one of which is a carbamate or urea group that is the reaction product of (1) an hydroxyl group of a first compound that is the result of a ring-opening reaction between a compound with an epoxy group and a compound with an organic acid group and (2) cyanic acid or a carbamate or urea group-containing compound.

The coating composition may include a further resinous material, for example one or more of the carbamate-functional materials described in Ohrbom et al., U.S. Pat. No. 6,165,618; Green et al., U.S. Pat. No. 5,872,195; McGee et al., U.S. Pat. No. 5,854,385; Green et al., U.S. Pat. No. 5,852,136; Ohrbom et al., U.S. Pat. No. 5,827,930; Menovcik et al., U.S. Pat. No. 5,792,810; McGee et al., U.S. Pat. No. 5,770,650; Ohrbom et al., U.S. Pat. No. 5,766,769; Bammel et al., U.S. Pat. No. 5,760,127; Menovcik et al., U.S. Pat. No. 5,744,550; Rehfuss et al., U.S. Pat. No. 5,719,237; Green, U.S. Pat. No. 5,693,724; Green, U.S. Pat. No. 5,693,723; Menovcik, U.S. Pat. No. 5,659,003; Briggs, U.S. Pat. No. 5,639,828; Rehfuss et al., U.S. Pat. No. 5,336,566; Ohrbom et al., U.S. Pat. No. 6,541,594; and Ohrbom et al., U.S. Pat. No. 6,362,285, each of which is incorporated herein by reference. The carbamate-functional material can be a compound or an oligomer (that is, with up to ten or so repeating monomer units). Preferably the carbamate-functional material has a molecular weight (for a compound), or number average molecular weight (for an oligomer) of up to about 2,000, preferably up to about 1,800.

Primer and primer surfacer compositions may further include one or more pigments and typically include one or more fillers. Basecoat and one layer topcoat compositions further include one or more color pigments and/or one or more special effect pigments, including metallic flake pigments and pearlescent pigments. Clearcoat compositions may be tinted.

The invention is further described in the following examples. The examples are merely illustrative and do not in any way limit the scope of the invention as described and claimed.

TABLE 1

ACRYLIC POLYMERS WITH CARBAMATE MONOMER
(solvent-borne): Polymer 1

| Ingredient | Amount (g) |
|---|---|
| Aromatic 100 solvent | 37 |
| Carbamate propyl acrylate | 87 |
| Cardura ® E[1] | 74.1 |
| Cyclohexyl methacrylate | 17.8 |
| Methacrylic acid | 24.7 |
| Propylene glycol methyl ether | 78 |
| Toluene | 10 |
| Vazo ® 67 | 17.3 |
| Xylene | 33.3 |

[1]Cardura ® E being a branched aliphatic glycidyl ether, commercially obtained from Shell Oil Company.

To a reactor containing 74.1 g of Cardura® E and 37 g of Aromatic 100 solvent kept at 140° C., a mixture of 24.7 g of methacrylic acid, 17.8 g of cyclohexyl methacrylate, 87 g of carbamate propyl acrylate (CPA) and 17.3 g of Vazo® 67 (from E.I. DuPont de Nemours) in 33.3 g of xylene, and 10 g of toluene is added over three hours. After the addition, the reactor is held at 140° C. for an additional two hours to complete the reaction. The reactor is then cooled to 120° C. and solvents are stripped off under vacuum. To the 99+ solids resin, 78 g of propylene glycol methyl ether is added to form a resin solution at 67.3% solids with a theoretical $T_g$ (determined using the Fox equation) of 49° C. The molecular weight (measured against a polystyrene standard) is found to be about $M_n$ 2,195, $M_w$ 4,620 with a polydispersity of 2.1. Titration revealed that 50% of the acid and epoxide had reacted.

It should be understood that a carbamated polyacrylic with acid-functionality can be reacted with the Cardura® E prior to blending it with crosslinkers and additives, or the Cardura® E can be added as an additive that will react with the acid-functionality during cure of the composition.

TABLE 2

Polymer 2

| Ingredient | Amount (g) |
|---|---|
| Acrylic acid | 87.5 |
| Amyl acetate | 400 |
| n-butyl acrylate | 75 |
| t-butyl peroxy 2-ethylhexanoate | 75 |
| Carbamate propyl acrylate | 91.6 |
| 2 ethylhexyl acrylate | 73.7 |
| Styrene | 76 |

To a reactor containing 75 g of amyl acetate at 100° C., a mixture of 91.6 g of carbamate propyl acrylate (CPA), 73.7 g of 2-ethylhexyl acrylate, 87.5 g of acrylic acid, 76 g of styrene, 75 g of n-butyl acrylate in 25 g of amyl acetate, and a mixture of 75 g of tert-butyl peroxy 2-ethylhexanoate in 75 g of amyl acetate, are added over three hours. After the addition, the reactor is held at 100° C. for an additional two hours to complete the reaction. The mixture is then cooled to 80° C. and another 250 g of amyl acetate is added to form a resin solution at 46.5% solids with a theoretical $T_g$ (determined using the Fox equation) of 22.8° C., having an equivalent weight of 332 g/acid. The molecular weight (measured against a polystyrene standard) is found to be about $M_n$ 3,240, $M_w$ 5,640 with a polydispersity of 1.7.

TABLE 3

Clearcoat Example 1: HPC Resin containing Cardura ® E

| Ingredient | Fixed Vehicle (%) | Amount (g) |
|---|---|---|
| HPC Acrylic Resin w/Cardura ® E (Polymer 1) | 71.294 | 105.93 |
| Butylated Melamine Formaldehyde Resin | 17.325 | 30.66 |
| Rheology Modifier Dispersion | 5.781 | 20.24 |
| UV Absorber | 3.000 | 3.16 |
| Hindered amine light stabilizer (HALS) | 1.500 | 1.50 |
| Flow Additive Modifier | 0.400 | 0.77 |
| Acid Catalyst | 0.700 | 2.80 |
| Butyl Cellosolve Acetate | | 14.00 |
| Hi-Sol ® 10 (from Ashland Chemical) | | 20.37 |
| TOTAL | 100.000 | 199.43 |

TABLE 4

Clearcoat Example 2: HPC Acrylic Resin

| Ingredient | Fixed Vehicle (%) | Amount (g) |
|---|---|---|
| HPC Acrylic Resin (Polymer 2) | 71.655 | 98.16 |
| Butylated Melamine Formaldehyde Resin | 16.964 | 30.02 |
| Rheology Modifier Dispersion | 5.781 | 20.24 |
| UV Absorber | 3.000 | 3.16 |
| Hindered amine light stabilizer (HALS) | 1.500 | 1.50 |
| Flow Additive Modifier | 0.400 | 0.77 |
| Acid Catalyst | 0.700 | 2.80 |
| Butyl Cellosolve Acetate | | 14.00 |
| Hi-Sol ® 10 (from Ashland Chemical) | | 33.35 |
| TOTAL | 100.000 | 204.00 |

Clearcoat Formulations

Tables 3 and 4 provide two clearcoat compositions. Clearcoat Example 1 (Table 3) provides an HPC acrylic resin containing Cardura® E; Clearcoat Example 2 (Table 4) provides an HPC acrylic resin without the addition of Cardura® E. These high solids carbamate clearcoats are formulated as follows. The carbamate-functional acrylic resin is combined with melamine and the rheology dispersion in an appropriate container equipped with an air mixer. A UV absorber, hindered amine light stabilizer, flow additive, and acid catalyst are added under agitation. The samples are reduced to a spray viscosity of 35 seconds on a #4 Ford Viscosity Cup at 80° F. and the weight of non-volatiles is determined according to ASTM D2369 (1 hour at 110° C.).

Table 5 provides a comparison of the various paint testing results obtained using the comparative clearcoat Examples 1 and 2 with a UreGloss® carbamate clearcoat as a control (available from BASF Corporation). Details of each test follow below. As evidenced by the results, the clearcoat compositions of the present invention provide a clearcoat film having the required hardness and etch characteristics with unexpectedly less yellowing.

TABLE 5

Comparative Paint Testing Results

|  | UreGloss ® Control Carbamate Clearcoat | Example 1 | Example 2 |
|---|---|---|---|
| Weight of Non-Volatiles (g) | 50.89 | 51.14 | 50.00 |
| 140 QCT Cleveland Condensing Humidity | | | |
| Initial | 1.5 | 2 | 2 |
| Recovered | 1.5 | 1.5 | 1.5 |
| Repair Adhesion | | | |
| 260° F. | 100 | 100 | 100 |
| 300° F. | 100 | 100 | 100 |
| Hardness (Tukon) | 10.5 | 11.2 | 9.2 |
| Nanoscratch | | | |
| Fracture Load | 12.21 | 12.23 | 11.96 |
| Plastic Deformation | 0.21 | 0.27 | 0.27 |
| Scratch & Mar Crockmeter (9 μm paper) | 68.87 | 67.86 | 68.34 |
| Yellowing (300-275° F.) | 2.04 | 1.98 | 1.87 |
| Weatherometer (4,500 Hr) | 87.1 | 92.0 | 90.9 |

Panel Preparation

The clearcoat samples are all applied via air-atomized spray gun wet-on-wet over a conventional black water base basecoat which is sprayed over 4×12 inch electrocoated and primed steel panels. The water base basecoat is flashed for 5 minutes at 140° F. before the clearcoat is applied. The basecoat film thickness is about 0.7 mil (18 microns) and the clearcoat film builds are about 1.8-2.0 mil (46-51 microns). After application, the panels are allowed to flash at ambient temperature for 10 minutes and then baked in a gas fired convection oven for 20 minutes at 275° F. (129° C.) metal temperature.

140° QCT

Panels for Cleveland Condensing Humidity are subjected to 140° F. temperature and 100% relative humidity for 24 hours in a standard QCT cabinet. Immediately after being pulled from the cabinet they are evaluated for blanching or whitening and any sign of blistering. After a four hour recovery to let any water escape the film, the panels are again evaluated. As used in Table 8, the scale is 1-5, with 1 being the best.

Repair Adhesion

Two OEM panels of each clearcoat are sprayed on a 4×18 electrocoated steel panel. The water base basecoat is applied at about 0.7 mil, and the clearcoat is applied in a wedge from 0-2.5 mil top to bottom. One panel is baked for 15 min at 260° F. and the second is baked for 90 min. at 300° F. A repair coat is then applied to each panel consisting of about 0.7 mil basecoat and 1.8-2 mil clearcoat. The panels are then baked for 20 min at 275° F. The full length of the wedge is crosshatch scribed and 3M 610 tape is applied and peeled off. The percentage of repair coat that adhered is recorded.

Nanoscratch

The nanoscratch test is performed as specified in ASTM D01 Nanoscratch WK2220 (under evaluation). A fracture load of greater than 13 and a plastic deformation less than 0.35 indicates a Class 1 scratch & mar resistant coating.

Crockmeter

The crockmeter method determines the initial gloss of each 4×12 coated panel at three points. The panels are subsequently marred at these areas using a mechanically driven AATCC Atlas Crockmeter with 3M 9 μm polishing paper. The 20° gloss (ASTM D523) is measured using a gloss meter on both the unmarred part of the panel and the marred parts of the panel. The difference in gloss is a measure of the mar resistance. The smaller the difference, the greater the mar resistance. A percentage of gloss retention is calculated by the following formula: Percent Gloss Retention=[(Difference in Gloss)/(Initial Gloss)]×100. The larger the percent gloss retention, the greater the mar resistance.

Yellowing

Two plaques of each clearcoat are sprayed at a precise 2 mil film build over 4×12 panels that are primed and coated with white water base basecoat at a standard 1 mil thickness. One panel is baked for 25 min at 275° F. and the other is baked for 90 min at 300° F. The yellowing (b value) for each panel was measured on a color meter and the difference between the normal bake and overbake panel is recorded. Lower differences are preferred.

The invention has been described in detail with reference to preferred embodiments thereof. It should be understood, however, that variations and modifications can be made within the spirit and scope of the invention.

What is claimed is:

1. A coating composition, comprising a glycidyl ester of neodecanoic acid and a copolymerization product of a monomer mixture comprising one or more carbamate-functional monomers selected from the group consisting of carbamate propyl acrylate, carbamate propyl methacrylate, carbamate ethyl methacrylate, and combinations thereof, and one or more carboxylic acid-functional monomers, wherein the mixture is essentially free of hydroxyl monomers.

2. The coating composition according to claim 1, further comprising at least one crosslinker reactive with carbamate-functionality.

3. The coating composition according to claim 2, wherein the crosslinker comprises an aminoplast resin.

4. A method of making a clearcoat layer on a substrate, the method comprising:
    making a polymer by copolymerizing a monomer mixture comprising one or more carbamate-functional monomers selected from the group consisting of carbamate propyl acrylate, carbamate propyl methacrylate, carbamate ethyl methacrylate, and combinations thereof with one or more carboxylic acid-functional monomers, wherein the mixture is essentially free of hydroxyl monomer;
    preparing a clearcoat coating composition comprising the polymer, a glycidyl ester of a mixture of tertiary acids having 9 to 11 carbon atoms and at least one methyl group on the α-carbon, and an aminoplast crosslinker;
    applying the clearcoat coating composition to a substrate having a basecoat; and
    curing the composition.

5. The method according to claim 4, wherein the tertiary acid has from 9 to 11 carbon atoms having at least one methyl group on an α-carbon.

6. The method according to claim 4, wherein a condensation product of the polymer and the glycidyl ester of a mixture of tertiary acids is formed during cure.

7. A process for coating a water-borne basecoat with a solvent-borne clearcoat, the process comprising:

applying a water-borne basecoat coating composition over a substrate;

applying a solvent-borne clearcoat coating composition over the basecoat coating composition, the clearcoat coating composition comprising a copolymerization product of a monomer mixture comprising one or more carbamate-functional monomers selected from the group consisting of carbamate propyl acrylate, carbamate propyl methacrylate, carbamate ethyl methacrylate, and combinations thereof and one or more carboxylic acid-functional monomers, wherein the monomer mixture is essentially free of hydroxyl monomer; and curing the applied basecoat and clearcoat coating compositions to form a composite coating layer, further wherein either:

(i) the monomer mixture further comprises a glycidyl ester of a mixture of tertiary acids having 9 to 11 carbon atoms and at least one methyl group on the α-carbon or (ii) the solvent-borne clearcoat coating composition further comprises a glycidyl ester of a mixture of tertiary acids having 9 to 11 carbon atoms and at least one methyl group on the α-carbon.

* * * * *